(12) United States Patent
Kurosawa

(10) Patent No.: US 7,541,783 B2
(45) Date of Patent: Jun. 2, 2009

(54) FLYWHEEL ELECTRIC GENERATOR

(75) Inventor: Keiji Kurosawa, Chiba (JP)

(73) Assignees: Value Supplier & Developer Corporation, Noda-shi, Chiba (JP); Kabushiki Kaisha Fjuimi Plant, Nagoya, Aichi-ken (JP)

( * ) Notice: Subject to any disclaimer, the term of this patent is extended or adjusted under 35 U.S.C. 154(b) by 0 days.

(21) Appl. No.: 12/018,267

(22) Filed: Jan. 23, 2008

(65) Prior Publication Data

US 2008/0180067 A1    Jul. 31, 2008

(30) Foreign Application Priority Data

Jan. 26, 2007   (JP)   ............... 2007-016370

(51) Int. Cl.
H02K 7/02    (2006.01)

(52) U.S. Cl. ............................ 322/4; 310/74

(58) Field of Classification Search .......... 322/4; 310/74, 113; 290/1 R; 74/572.11

See application file for complete search history.

(56) References Cited

U.S. PATENT DOCUMENTS

| | | | | |
|---|---|---|---|---|
| 5,245,270 | A * | 9/1993 | Akiyama | 322/4 |
| 5,446,319 | A * | 8/1995 | Pawlowski | 290/1 R |
| 5,831,362 | A * | 11/1998 | Chu et al. | 310/90.5 |
| 6,043,577 | A * | 3/2000 | Bornemann et al. | 310/74 |
| 6,118,194 | A | 9/2000 | Kawamura | |
| 6,236,127 | B1 * | 5/2001 | Bornemann | 310/74 |
| 2005/0162134 | A1 | 7/2005 | Smith | |
| 2005/0258692 | A1 | 11/2005 | Wise | |
| 2006/0181170 | A1 * | 8/2006 | Fiset | 310/113 |
| 2006/0244263 | A1 * | 11/2006 | Manning | 290/1 R |
| 2006/0261596 | A1 | 11/2006 | Smith | |
| 2007/0120430 | A1 * | 5/2007 | Kurosawa | 310/74 |

FOREIGN PATENT DOCUMENTS

| | | |
|---|---|---|
| DE | 19608099 C1 | 2/1997 |
| DE | 19804177 A1 | 9/1998 |
| EP | 1793480 A | 6/2007 |
| ES | 2123442 | 1/1999 |
| JP | 06-303738 | 10/1994 |
| WO | 01/43258 A2 | 6/2001 |
| WO | 2005/050825 A1 | 6/2005 |

OTHER PUBLICATIONS

Extended European Search Report, dated Dec. 15, 2008, in Application No. 08001124.0—2007.
Angrist, S W: "Perpetual Motion Machines" Scientific American, Scientific American, Inc., New York, NY, US, vol. 218, No. 1, Jan. 1, 1968, pp. 114-122, XP002036811 ISSN: 0036-8733.

* cited by examiner

Primary Examiner—Julio Gonzalez
(74) Attorney, Agent, or Firm—Banner & Witcoff, Ltd

(57) ABSTRACT

Torque auxiliary units 30 are disposed at opposed positions outside rotary traces of the rotating permanent magnets 18 provided for the flywheel 11, in which permanent magnets 31 are arranged so as to be the same polarities as those of rotating permanent magnets 18 by being moved by cams 28 attached to a flywheel 11.

8 Claims, 4 Drawing Sheets

FLYWHEEL ELECTRIC GENERATOR

BACKGROUND OF THE INVENTION

1. Field of the Invention

The present invention relates to a flywheel electric generator utilizing rotational kinetic energy of a flywheel.

2. Description of the Related Art

As is well known, the flywheel electric generator is an electric generator to store electric power in a flywheel provided for a rotor of the electric generator, as kinetic energy, so as to discharge the kinetic energy as the electric power. That is, the flywheel electric generator employs an energy storage system by which electric energy is converted into rotational energy of an object having large inertia moment to output and input the electric power. In general, the flywheel electric generator is often utilized to supply electric power to a load in need of pulse-like large electric power.

For instance, a nuclear fusion system confining plasma by means of a magnetic field supplies electric power of several hundreds of thousands kW in a short time such as several seconds sometimes, so that it is disagreeable to directly obtain such pulse-like electric power from an electric power system because the influence on the power system is too considerable. Therefore, such a filed of the electric power system employs the flywheel electric generator. The flywheel electric generator operates in such a cycle that it increases the number of rotations of an electric generator over a time period of several minutes to store the kinetic energy in the flywheel, and discharges the kinetic energy stored in the flywheel in supplying the electric power to a load to result in a decrease in the number of the rotations of the electric generator.

As to the conventional flywheel electric generator, a flywheel electric generator which uses a high-temperature superconductor for a magnetic bearing is proposed other than a flywheel electric generator which attaches a flywheel to a usual electric generator and operates in the atmosphere by using a usual bearing (e.g., refer to Jpn. Pat. APPln. KOKAI Publication No. 6-303738).

However, the flywheel using the high-temperature superconductor as the magnetic bearing is not a good idea because it needs to store the flywheel electric generator in a sealed container, makes a whole of the apparatus be complex and large in size and also takes a lot of trouble in work of maintenance and check and in restart after the maintenance and check.

BRIEF SUMMARY OF THE INVENTION

The present invention is made on the basis of the foregoing situation, and an object of the present invention is to provide a flywheel electric generator capable of obtaining an output with efficiency even in the atmosphere.

A flywheel electric generator according to an embodiment of the present invention includes a start-up motor having a rotary shaft; a first pulley rotary shaft that receives transfer of rotation of the rotary shaft of the start-up motor through belt transmission; a flywheel having a flywheel rotary shaft that receives transfer of rotation of the first pulley rotary shaft through a first clutch; a plurality of driving permanent magnets which are disposed at even angle intervals on an outer circumferential section of the flywheel; torque auxiliary units which are fixedly arranged around the flywheel and have driving permanent magnets rotatably disposed in one direction around a vertical rotary shaft; a second pulley rotary shaft that receives transfer of the rotation of the first pulley rotary shaft through a second clutch; and an electric generator rotary shaft that receives rotation of the second pulley rotary shaft.

In the flywheel electric generator, the flywheel is composed of a pair of disks fixed in parallel on an upper and a lower sections of the vertical rotary shaft; a plurality of support plates disposed in vertical directions at even angle intervals around the disks so as to couple the disks with each other; and cams disposed on the lower disk among the pair of disks and a part of cams are protruded outside from the outer circumference of the flywheel, and the driven permanent magnets are fixed on at least three support plates disposed at even angle intervals among the support plates.

Further, in the flywheel electric generator, the plurality of driven permanent magnets is fixed on each of the three support plates, respectively.

Further, in the flywheel electric generator, the plurality of support plates are arranged by giving their plate faces tilts so that side parts to be front edges toward the rotary direction of the flywheel are positioned closer to a center part of the flywheel than side parts to be rear edges.

Further, in the flywheel electric generator, the driven permanent magnets are rectangular plate-like magnets, and their plate faces are arranged by giving the plate faces tilts so that the side parts to be front edges toward the rotary direction of the flywheel are positioned closer to the center part of the flywheel than side parts to be rear edges.

Further, in the flywheel electric generator, each of the torque auxiliary units consists of a pair of rotary disks fixed at an upper and a lower sections of the vertical rotary shaft; a plurality of magnet holders fixed at even angle intervals around the vertical rotary shaft between the rotary disks; one-direction rotary clutches coupled with the vertical rotary shaft; and cam followers disposed on the lower face of the lower rotary disk among the pair of rotary disks and engaged with cams of the flywheel, and the plurality of driving permanent magnets are fixed to the magnet holders, respectively.

Further, in the flywheel electric generator, the driving permanent magnets are rectangular plate-like magnets, and their plate faces are arranged by giving the plate faces tilts so that the side parts to be rear edges toward the rotary direction of a pair of rotary disks of the torque auxiliary unit are positioned closer to the center part of the pair of rotary disks than the side parts to be front edges.

Further, in the flywheel electric generator, the torque auxiliary units are plurally arranged at even angle intervals around the flywheel.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, an optimal form to embody the invention will be described with reference to the drawings.

Figure 1:
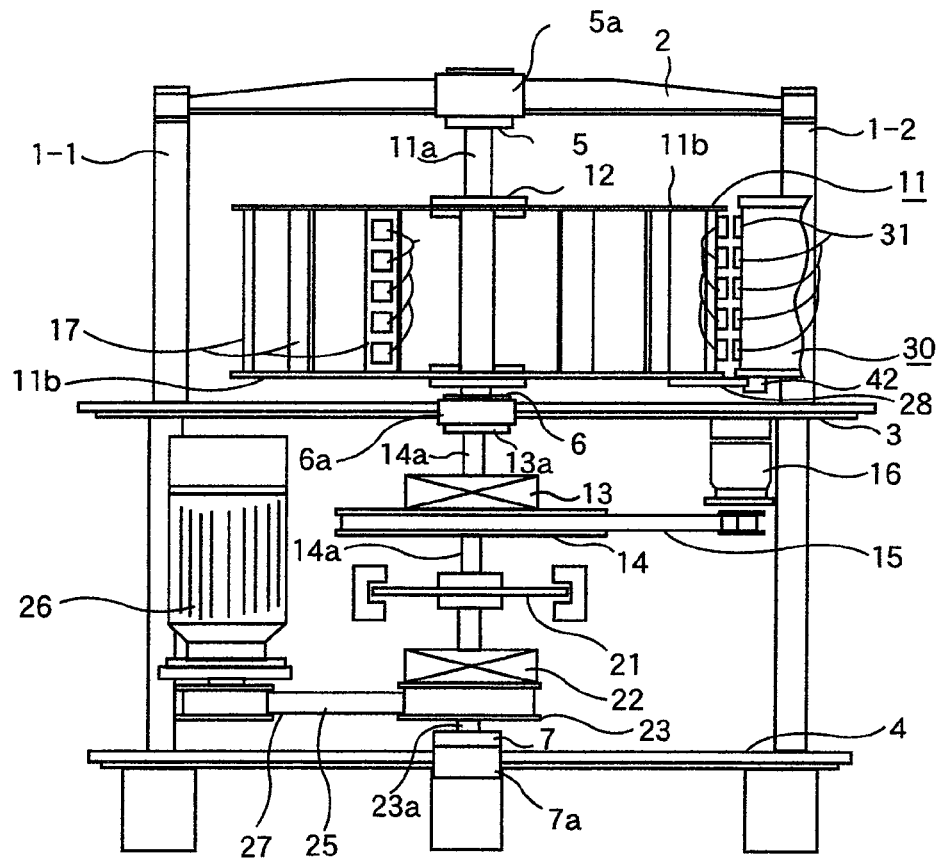
FIG. 1 is a configuration explanation view illustrating an embodiment of a flywheel electric generator of the present invention.
Figure 3:
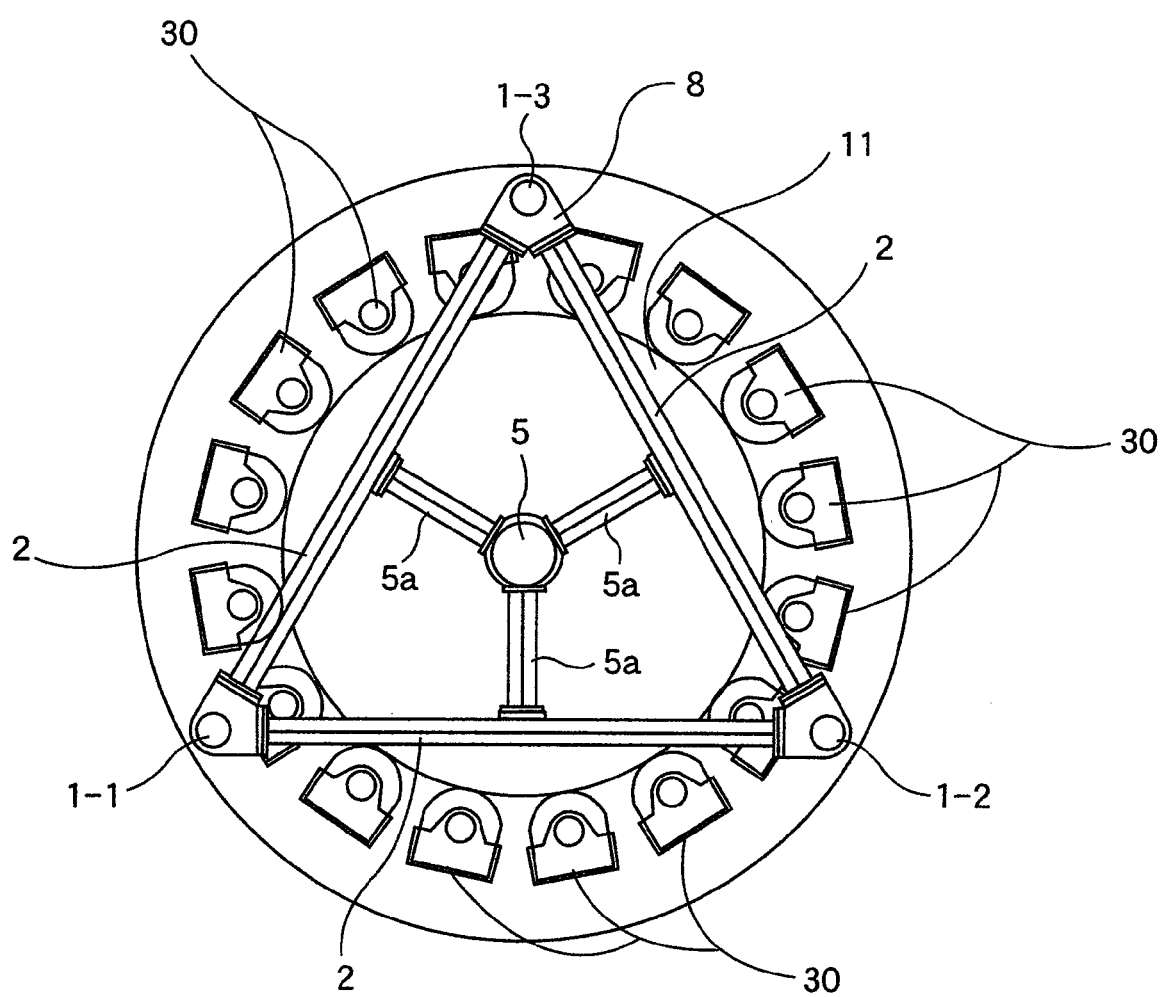
FIG. 3 is a plane view illustrating an arrangement of torque auxiliary units in the flywheel electric generator of the invention.

FIG. 1 shows a front elevation view depicting a schematic structure of a flywheel electric generator that is an embodiment of the invention, and FIG. 3 shows its plane view.

In the flywheel electric generator, as shown in FIG. 3, each angle structure 2, 3 and 4 on an upper stage, a middle stage and a lower stage of which the plane face is roughly regular triangle is fixedly arranged at positions differing in height from above to below, respectively, at three fixed poles 1-1, 1-2 and 1-3 arranged vertically at tops of almost regular triangle. In each angle structure 2, 3 and 4, an upper stage bearing 5, a middle stage bearing 6 and a lower stage bearing 7 are arranged at the center position of the roughly regular triangle shape, respectively, and they are supported with bearing support poles 5a, 6a and 7a, respectively.

The flywheel 11 is fixed to a flywheel rotary shaft 11a pivotably supported by the upper bearing 5 of the upper angle structure 2 and the middle stage bearing 6 of the middle stage angle structure 3 through a hub 12. The rotary shaft 11a passes though the middle stage bearing 6 of the middle angle structure 3 is extended downward thereof and its lower end is coupled with a first pulley rotary shaft 14a through a clutch plate 13a of a first electromagnetic clutch 13. That is, power is transmitted or shut off between the flywheel rotary shaft 11a and the first pulley rotary shaft 14a in accordance with opening/closing drive of the first electromagnetic clutch 13. The first pulley 14 is coupled with a start-up motor 16 fixed on the lower surface side of the middle stage angle structure 3 through a transmission belt 15 stretched, and rotary power of the start-up motor 16 is transmitted to the first pulley 14. The start-up motor 16 is, for example, a two-pole motor of 2.2 kW with an inverter used therein and its number of rotations is 3,400 rpm.

The structure of the flywheel 11 is, as shown in FIG. 1, a rotary body in which two disks 11b separately disposed in parallel are fixed with a plurality of (e.g., an even number such as eight) support plates 17 arranged at even angles (e.g., 20°). These support plates 17 are formed of metals heavy in weight, for example, iron. Thereby, these support plates 17 also operate as weights to increase centrifugal force and inertial force of the flywheel 11. On three support plates 17 placed at angle positions of 120° to the center of the disk 11b among support plates 17 fixedly supporting two disks 11b, five rotating permanent magnets 18 are fixed at almost even intervals in their height direction.

Cams 28 to be protruded from the outer circumference of the disks 11b are provided for the disks 11b near by the lower end of each support plate 17 with the rotating permanent magnets 18 disposed thereon. These cams 28 drive cam flowers 42 fixed to the below mentioned torque auxiliary units 30 in accordance with the rotation of the flywheel 11.

Figure 2:
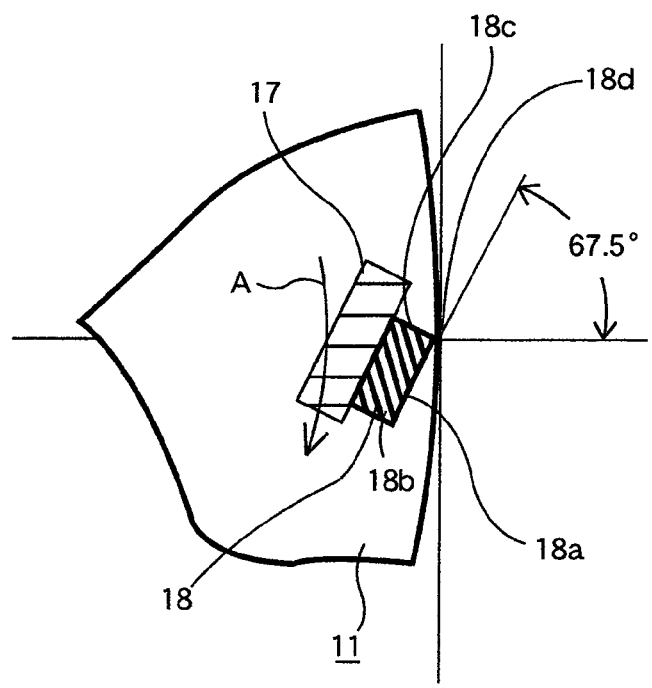
FIG. 2 is a partially enlarged plane view illustrating an arrangement state of rotary permanent magnets on the flywheel of the flywheel electric generator of the invention.

While the plane shapes of the permanent magnets 18 fixed to the support plates 17 of the flywheel 11 are rectangular as depicted in the partially enlarged plane view of FIG. 2, long sides 18a are tiltedly arranged to tangent line directions of the disks 11b of the flywheel 11.

This inclination is made so that a short side 18b positioned at the tip end in the rotation direction (an arrow A) of the disk 11b of the flywheel 11 is placed more inner side of the radius direction of the disk 11b than a short side 18c placed at the rear end. In this case, the top 18d positioned on an outer circumference side of the disk 11b of the permanent magnet 18 is disposed at the outer circumference edge of the disk 11b. The angle of the long side 18a of the permanent magnet 18 against the radius direction of the disk 11b passing through the top 18d is set to 67.5° from a result of experiment. Thus, fixing the face on which the permanent magnets 18 of the support plates 17 are attached with inclination of 67.5° to the radius direction of the disk 11b enables the permanent magnets 18 to be set at the foregoing angles.

As shown in the plane view of FIG. 3, sixteen of the torque auxiliary units 30 are disposed at even intervals (even angles) along a trace outside a trace (circumference shape) rotating according to the rotations of the flywheel 11.

The following will describe relationships between the flywheel 11 and the torque auxiliary units 30 assisting the torque of the rotation force of the flywheel 11.

As illustrated in FIG. 1, with the rotation of the flywheel 11, the rotating permanent magnets 18 fixed on the support plates 17 of the flywheel 11 rotate. Sixteen torque auxiliary units 30 are arranged at even intervals on a circumference of a circle near by the trace of the rotations of the permanent magnets 18 at the outer side of the trace. By facing each of the same poles of fixed permanent magnets 31 the rotating permanent magnets 18, each torque auxiliary unit 30 assists the rotation torque of the flywheel depending on reaction force.

Figure 4:
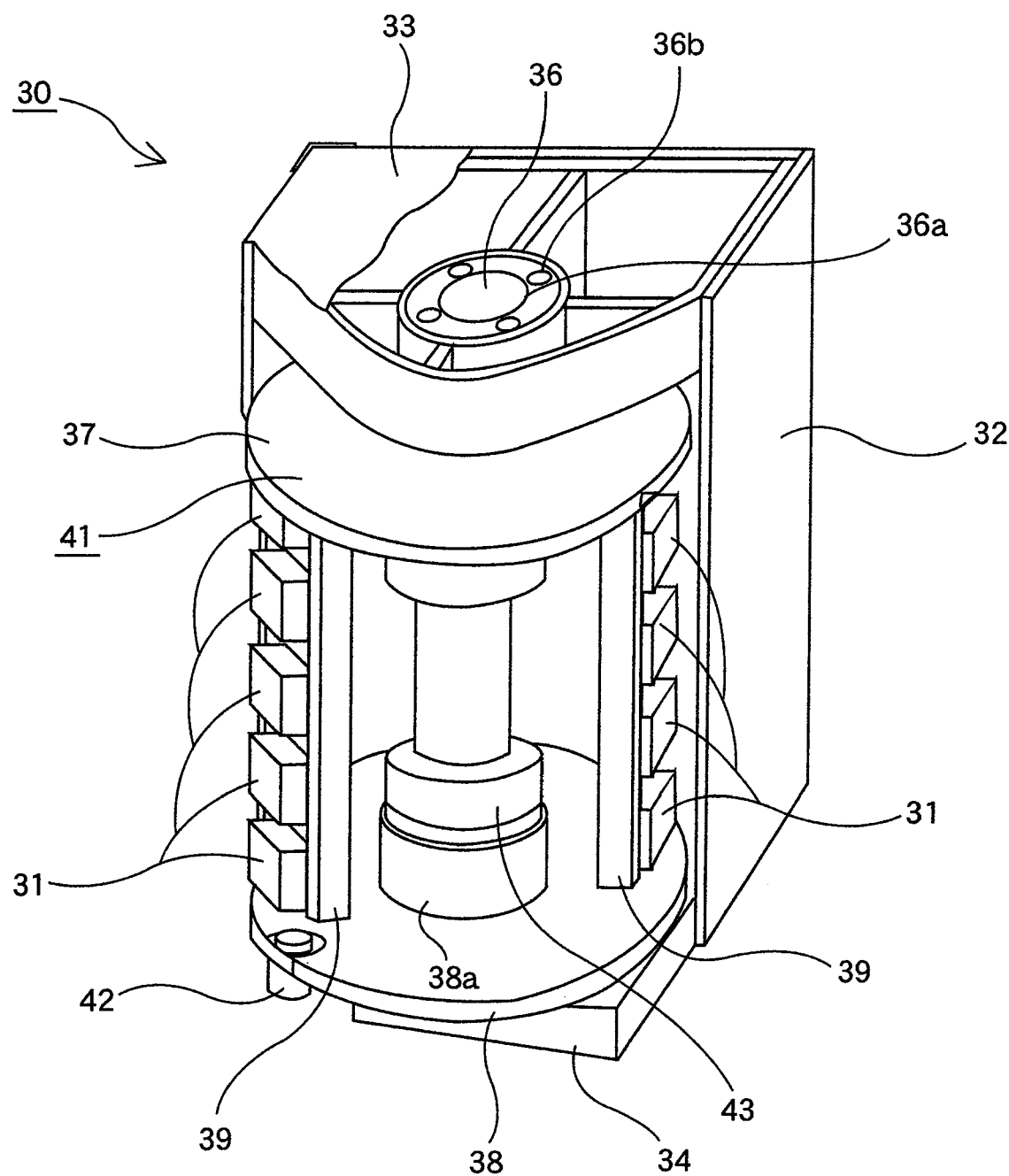
FIG. 4 is a partially cut out perspective view in the flywheel electric generator of the invention.

FIG. 4 is a perspective view depicting the torque auxiliary unit 30 by partially cutting out. The auxiliary unit 30 has a box-like housing 32 of which the one side face is opened. A rotary shaft 35 is vertically and pivotably supported between an upper bearing 36 that is a radial bearing disposed on an upper plate 33 of the housing 32 and a lower bearing (not depicted) disposed on a lower plate 34 of the housing 32. The upper bearing 36 is fixed with a support plate 36a disposed at an upper section of the housing 32. An upper rotary plate 37 and a lower rotary plate 38 are fixed just below the upper bearing 36 of the rotary shaft 35 and just above the lower bearing thereof. A magnet holder 39 extended in three vertical directions for each 120° on the lower face of the upper rotary plate 37 and on the upper face of the lower rotary plate 38 around the rotary shaft 35 as a rotary center between the upper rotary plate 37 and the lower rotary plate 38. The respective five permanent magnets 31 of which the plane shapes have rectangular shapes are fixed at the positions facing the respective five rotating permanent magnets 18 fixed on the support plates 17 of the flywheel 11, respectively. Roller-like cam followers 42 are fixed at the positions corresponding to three magnet holders 39 on the lower face of the lower rotary plate 38, respectively. Since the upper rotary plate 37, the lower rotary plate 38 and the magnet holders 39 rotate together with the rotary shaft 35, they are referred to as an auxiliary unit rotary body 41 of the torque auxiliary unit 30 hereinafter.

Figure 5:
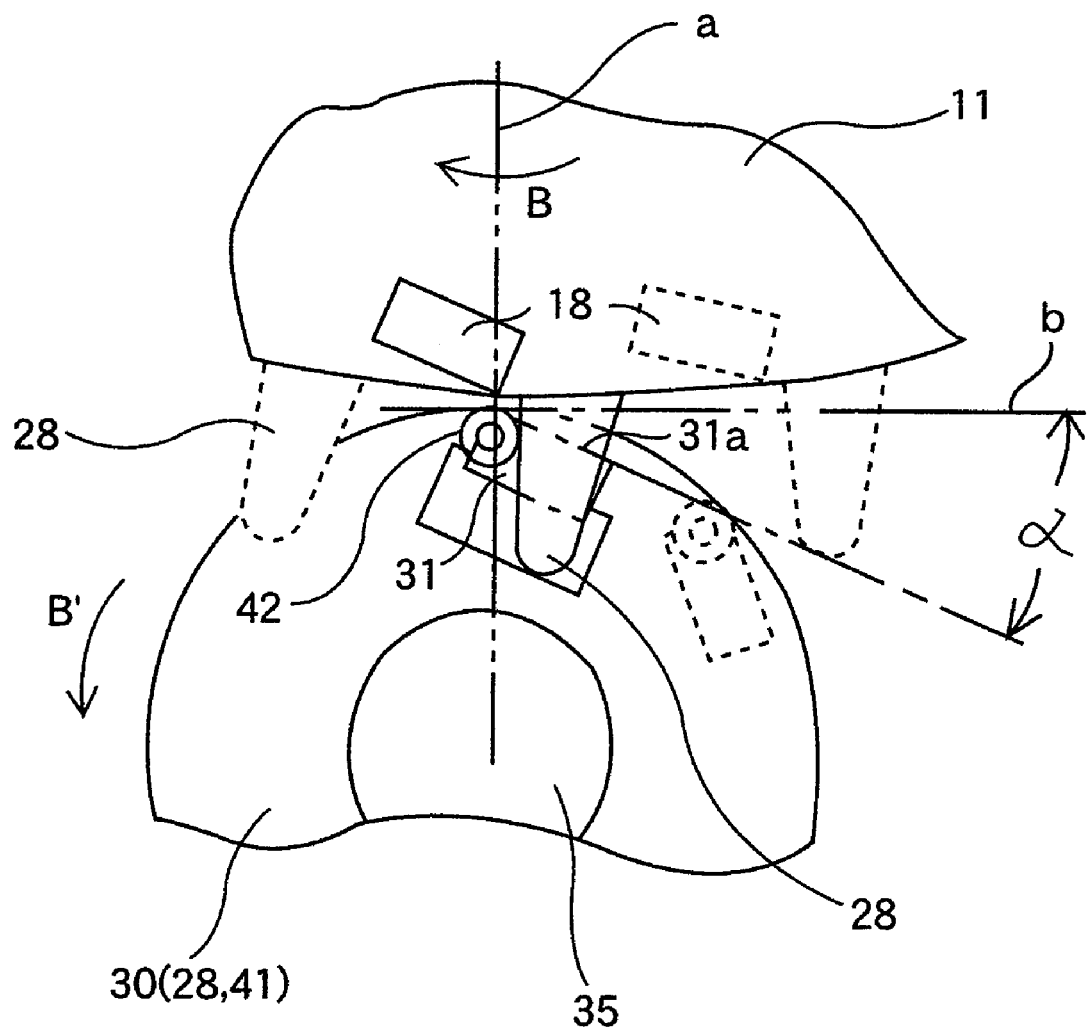
FIG. 5 is a partially enlarged view of the torque auxiliary units in the fly wheel electric generator of the invention.

FIG. 5 shows a partially enlarged plane view for explaining rotary torque auxiliary operations of the flywheel 11 generated from the auxiliary unit 30. Each permanent magnet 31 fixed to the magnet holder 39 of the auxiliary unit 30 is arranged at an inclination of $\alpha=22.5°$, wherein a represents an intersection angle between a long side 31a of the plane shape of the rectangular of the permanent magnet 31 and a normal line 'a' of the lower rotary plate 38 with a disc shape passing through the center of the cam follower 42. Here, each of the cam followers 42 is rotatably disposed at the position corresponding to the top 31d positioned at the circumferential section of the lower rotary plate 38 of the permanent magnet 31. According to experiment, it is preferable for an inclination angle α is 30° or smaller, and it is confirmed that a center value of the preferable inclination angle a is about 90°-67.5°=22.5°.

As illustrated in FIG. 4, a one-direction rotary clutch 43 is disposed coaxially with the rotary shaft 35 at a hub 38a of the lower rotary plate 38. The clutch 43 regulates the rotation direction of the rotary shaft 35 of the auxiliary unit 30 in one direction.

As depicted in a partially enlarged view for explaining operations, when the flywheel 11 with the foregoing structure rotates in an arrow B direction, the cam 28 provided for the flywheel 11 contacts with the cam follower 42 of the torque auxiliary unit 30 and rotates itself while pushing the cam follower 42. Since the cam follower 42 is pushed by the cam 28, the lower rotary plate 38 holding the cam follower 42 rotates in an arrow B' direction and the auxiliary unit rotary body 41 integrally structured with the lower rotary plate 38 also rotates around the rotary shaft 35 as a rotary center.

Rotating the rotary body 41 also rotates the permanent magnets 31 fixed to the magnet holder 39. At this moment, since the permanent magnets 31 have the same poles as those of the rotating permanent magnets 18 of the flywheel 11, the permanent magnets 31 rotate while giving torque caused by reaction force to the rotating permanent magnets 18. The permanent magnets 31 rotate from the positions from which the cam followers 42 of the auxiliary units 30 start to contact with cams 28 up to the positions at which the contacts are released and stop the rotations.

As shown in FIG. 4, since one-direction clutch 43 is provided for the rotary shaft 35, the permanent magnets 31 stop at the prescribed stop positions without turning back. Thereby, the reduction in torque, being caused by reaction force to be generated when the rotating permanent magnets 18 come close to the permanent magnets 31 of the auxiliary units 30, may be prevented. According to this stop position, the next torque auxiliary unit 30 is set to the position at which an influence occurs with the cam 28 disposed on the flywheel 11 at a prescribed position.

In the flywheel 11, the repeatedly continuous operations constantly give the reaction force from the permanent magnets 31 to the rotating permanent magnets 18. Thereby, the torque auxiliary units 30 continuously energize rotary force to the flywheel 11.

As shown in FIG. 1, the first pulley rotary shaft 14a is extended on the lower side of the first pulley 14, and a break disk 21 to operate as a disk break is fixed at the lower end of the rotary shaft 14a. The rotary shaft 14a is further extended on the lower side of the break disk 21, and a second electromagnetic clutch 22 is disposed at the lower end of the rotary shaft 14a. A second pulley rotary shaft 23a of which the one end is pivotably supported by the lower stage bearing 7 is fixed on the other rotary plate of the second electromagnetic clutch 22. A second pulley 23 is fixed to the second pulley rotary shaft 23a. The second pulley 23 couples with an electric generator pulley 27 fixed to the rotary shaft of an electric generator 26 through a transmission belt 25 and is rotated in accordance with the rotation of the electric generator pulley 27. The electric generator 26 has, for example, rating of 7.5 kW and 600 rpm at 30 Hz.

The following will describe operations of power generation of the flywheel 11 configured as mentioned above. Each part of the flywheel 11 will be quoted from that of FIG. 1 to FIG. 3.

(Step 1) . . . Start-Up Step

The Step 1 closes the first electromagnetic clutch 13 and brings the second electromagnetic clutch 22 into a sate of being opened. When the start-up motor 16 is rotated in such a state, the rotary force from the motor 16 is transmitted to the first pulley 14 through the transmission belt 25 to rotate the first pulley rotary shaft 14a. At this moment, since the first clutch 13 has been closed, the first pulley rotary shaft 14a and the flywheel rotary shaft 11a are coupled with each other. Therefore, the rotation of the rotary shaft 14a is transmitted to the rotary shaft 11a to rotate the rotary shaft 11a, and starts up to rotate the flywheel 11 fixed to the rotary shaft 11a.

(Step 2) . . . Rotary Step of the Flywheel 11

After the start-up rotation of the flywheel 11, the Step 2 makes the first electromagnetic clutch 13 opened to release the coupling with the first pulley 14. That is, as depicted in FIG. 5, rotating the flywheel 11 in the arrow B direction contacts the cams 28 disposed at the flywheel 11 with the cam followers 42 of the torque auxiliary units 30 and push the cam followers 42 to rotate the cams 28 themselves. Since the cam followers 42 are pushed with the cams 28, the lower rotary plate 38 holding the cam followers 42 rotate in the arrow B' direction, and the auxiliary unit rotary bodies 41 integrally structured with the lower rotary plates 38 also rotate around the rotary shaft 35 as a rotary center.

The rotation of the rotary bodies 41 also rotate the permanent magnets 31 fixed to the magnet holders 39. At this moment, since the permanent magnets 31 have the same poles as those of the rotating permanent magnets 18 of the flywheel 11, the permanent magnets 31 rotate while giving rotary force due to reaction force to the rotating permanent magnets 18. The permanent magnets 31 rotate from the positions at which the cams 28 make contacts with the cam followers 42 up to the positions at which the cams 28 release the contacts and stop their rotations. Meanwhile, the flywheel 11 continuously rotates due to its inertia.

(Step 3) . . . Electric Power Generation Step

The Step 3 closes both the first electromagnetic clutch 13 and the second electromagnetic clutch 22 at the time when the number of rotations the flywheel 11 reaches a prescribed number. Operations of two clutches 13 and 22 join the flywheel rotary shaft 11a, the first pulley rotary shaft 14a and the second pulley rotary shaft 23a one another to rotate them. The rotations make the rotation of the flywheel 11 transmit to the second pulley rotary shaft 23a via the flywheel rotary shaft 11a and the first pulley rotary shaft 14a to rotate the second pulley rotary shaft 23a. The rotation of the second pulley rotary shaft 23a rotates the second pulley 23 and further rotates the electric generator pulley 27 via the transmission belt 25. Since the electric generator pulley 27 is fixed to the rotary shaft of the electric generator 26, the pulley 27 rotates the generator 26 through the rotary shaft to generate electric power.

When the rotation of the electric generator 26 has to be stopped, the rotation may be stopped by the operation of the disk break 21.

According to the aforementioned each Step, by operating the torque auxiliary units 30 from the flywheel 11 to the electric generator 26, torque not less than the rating of the generator 26 is applied. Therefore, the generator 26 may increase its electric power output.

It is our intention that the invention is not limited to the specific details and representative embodiments shown and described herein, and in an implementation phase, this invention may be embodied in various forms without departing from the spirit or scope of the general inventive concept thereof. Various types of the invention can be formed by appropriately combining a plurality of constituent elements disclosed in the foregoing embodiments. Some of the elements, for example, may be omitted from the whole of the constituent elements shown in the embodiments mentioned above. Further, the constituent elements over different embodiments may be appropriately combined.

What is claimed is:

1. A flywheel electric generator comprising:
   a start-up motor having a rotary shaft;
   a first pulley rotary shaft that receives transfer of rotation of the rotary shaft of the start-up motor through belt transmission;
   a flywheel with a flywheel rotary shaft that receives transfer of rotation of the first pulley rotary shaft through a first clutch;
   a plurality of driving permanent magnets which are disposed at even angle intervals on an outer circumferential section of the flywheel;
   torque auxiliary units which are fixedly arranged around the flywheel and have driving permanent magnets rotatably disposed in one direction around a vertical rotary shaft;
   a second pulley rotary shaft that receives transfer of the rotation of the first pulley rotary shaft through a second clutch; and
   an electric generator rotary shaft that receives rotation of the second pulley rotary shaft.

2. The flywheel electric generator according to claim 1, wherein the flywheel is composed of a pair of disks fixed in parallel on an upper and a lower sections of the vertical rotary shaft; a plurality of support plates disposed in vertical directions at even angle intervals around the disks so as to couple the disks with each other; and cams disposed on the lower disk among the pair of disks and a part of cams are protruded outside from the outer circumference of the flywheel, and the driven permanent magnets are fixed on at least three support plates disposed at even angle intervals among the support plates.

3. The flywheel electric generator according to claim 2, wherein the plurality of driven permanent magnets is fixed on each of the three support plates, respectively.

4. The flywheel electric generator according to claim 2, wherein the plurality of support plates are arranged by giving their plate faces tilts so that side parts to be front edges toward the rotary direction of the flywheel are positioned closer to a center part of the flywheel than side parts to be rear edges.

5. The flywheel electric generator according to claim 1, the driven permanent magnets are rectangular plate-like magnets, and their plate faces are arranged by giving the plate faces tilts so that the side parts to be front edges toward the rotary direction of the flywheel are positioned closer to the center part of the flywheel than side parts to be rear edges.

6. The flywheel electric generator according to claim 1, wherein each of the torque auxiliary units consists of a pair of rotary disks fixed at an upper and a lower sections of the vertical rotary shaft; a plurality of magnet holders fixed at even angle intervals around the vertical rotary shaft between the rotary disks; one-direction rotary clutches coupled with the vertical rotary shaft; and cam followers disposed on the lower face of the lower rotary disk among the pair of rotary disks and engaged with cams of the flywheel, and the plurality of driving permanent magnets are fixed to the magnet holders, respectively.

7. The flywheel electric generator according to claim 1, wherein the driving permanent magnets are rectangular plate-like magnets, and their plate faces are arranged by giving the plate faces tilts so that the side parts to be rear edges toward the rotary direction of a pair of rotary disks of the torque auxiliary units are positioned closer to the center part of the pair of rotary disks than the side parts to be front edges.

8. The flywheel electric generator according to claim 1, wherein the torque auxiliary units are plurally arranged at even angle intervals around the flywheel.

* * * * *

UNITED STATES PATENT AND TRADEMARK OFFICE
CERTIFICATE OF CORRECTION

PATENT NO. : 7,541,783 B2
APPLICATION NO. : 12/018267
DATED : June 2, 2009
INVENTOR(S) : Kurosawa It is certified that error appears in the above-identified patent and that said Letters Patent is hereby corrected as shown below:

On the Cover Page, Section 73:

Please delete "Kabushiki Kaisha Fjuimi Plant" and insert -- Kabushiki Kaisha Fujimi Plant --

Signed and Sealed this

Fifteenth Day of June, 2010

David J. Kappos
*Director of the United States Patent and Trademark Office*